(12) United States Patent
Gherrou et al.

(10) Patent No.: US 10,773,980 B2
(45) Date of Patent: Sep. 15, 2020

(54) METHOD AND SYSTEM FOR PREPARING A FENTON FE2+/H2O2 REAGENT

(71) Applicant: METAFIX INC., Lachine (CA)

(72) Inventors: Abdelaziz Gherrou, Dollard-des-Ormeaux (CA); John Riviere, Lachine (CA)

(73) Assignee: METAFIX INC., Quebec (CA)

( * ) Notice: Subject to any disclaimer, the term of this patent is extended or adjusted under 35 U.S.C. 154(b) by 106 days.

(21) Appl. No.: 16/203,828

(22) Filed: Nov. 29, 2018

(65) Prior Publication Data

US 2019/0177195 A1 Jun. 13, 2019

Related U.S. Application Data

(60) Provisional application No. 62/596,262, filed on Dec. 8, 2017.

(51) Int. Cl.
| | |
|---|---|
| *B22F 1/00* | (2006.01) |
| *C02F 1/72* | (2006.01) |
| *C02F 9/00* | (2006.01) |
| C02F 103/16 | (2006.01) |
| C02F 101/34 | (2006.01) |
| C02F 101/22 | (2006.01) |

(52) U.S. Cl.
CPC .............. *C02F 1/722* (2013.01); *B22F 1/004* (2013.01); *B22F 1/0088* (2013.01); *C02F 9/00* (2013.01); *C02F 2101/22* (2013.01); *C02F 2101/345* (2013.01); *C02F 2103/16* (2013.01); *C02F 2201/002* (2013.01); *C02F 2209/06* (2013.01); *C02F 2305/026* (2013.01)

(58) Field of Classification Search
CPC ........ B22F 1/004; B22F 1/0088; C02F 1/722; C02F 9/00; C02F 2101/22; C02F 2101/345; C02F 2103/16; C02F 2201/002; C02F 2209/06; C02F 2305/026
See application file for complete search history.

(56) References Cited

U.S. PATENT DOCUMENTS

| | | | |
|---|---|---|---|
| 9,382,140 B2 | 7/2016 | Gherrou et al. | |
| 2014/0353258 A1* | 12/2014 | Gherrou | C02F 1/70 210/757 |

* cited by examiner

*Primary Examiner* — Lucas A Stelling
(74) *Attorney, Agent, or Firm* — Norton Rose Fulbright Canada LLP

(57) ABSTRACT

The present description relates to a method and a system for generating a Fenton reagent. Particularly, the description relates to a method and a system for oxidizing contaminants from wastewater. The Fenton reagent can react with various organic compounds and metallic elements. The method of producing an in-situ Fenton reagent comprises: providing an aqueous solution comprising at least one contaminant; providing at least one column comprising i) an inlet and an outlet separated by a flow chamber, and ii) a mass of iron fibre in the flow chamber between the inlet and the outlet; providing at least one dispenser retaining a hydrogen peroxide generating solid and permitting passage of the aqueous solution through the dispenser; optionally acidifying the solution upstream of the at least one column, and passing the aqueous solution through the at least one column.

16 Claims, 2 Drawing Sheets

METHOD AND SYSTEM FOR PREPARING A FENTON FE2+/H2O2 REAGENT

The development of the present method and system was made in collaboration with the «Centre des technologies de l'eau» (Centre of Water Technologies) in Montreal; www.cteau.com.

FIELD

The present description relates to a method and a system for generating in situ a Fenton reagent. Particularly, the description relates to a method and a system for oxidizing contaminants from wastewater. The Fenton reagent can react with various organic compounds and metallic elements.

BACKGROUND

Organic matter and dissolved metallic compounds are found in wastewater and must be treated. The contaminants may be oxidized, a Fenton reagent, that is known as a solution of ferrous iron with hydrogen peroxide, $Fe^{2+}/H_2O_2$, can perform these types of oxidation reactions.

The preparation of the Fenton reagent $Fe^{2+}/H_2O_2$ is generally accomplished by mixing ferrous sulphate and hydrogen peroxide. The oxidation reaction efficiency is controlled by the ratio of $H_2O_2$ to $Fe^{2+}$. The procedure of preparing the Fenton reagent is relatively complicated and requires pumps, dosing systems and numerous tanks. This type of equipment requires exacting procedures, trained personnel leading to higher labour cost and operating cost.

Furthermore, although effective the use of hydrogen peroxide has a variety of drawbacks. Hydrogen peroxide is most commonly found in aqueous solutions. Low concentrations, of 6 wt. % $H_2O_2$ or less in water are widely available. However, higher concentrations of hydrogen peroxide are preferred for Fenton reagents.

These higher concentrations may be hazardous and require a clear understanding of the safety issues relating to hydrogen peroxide. Specifically, at higher concentrations $H_2O_2$ is corrosive, a strong oxidizer and dangerous to the health of individuals if incorrectly used, manipulated and/or stored.

High-concentration hydrogen peroxide streams, typically above 40 wt. %, are considered hazardous and require special storage and handling facilities, that are costly, both from a fixed cost and operational cost point of view. Hydrogen peroxide must be carefully stored in well-ventilated areas and away from other flammable materials. Under some circumstances hydrogen peroxide is highly explosive.

On the other hand, $Fe^{2+}$ is generally used as a ferrous sulfate solution, which has also some drawbacks (mixing, handling, storing the ferrous sulfate chemical).

With an increasing need to decontaminate wastewater there is a need for a Fenton reagent system that eliminates or significantly reduces the challenges associated with high concentrations of liquid hydrogen peroxide solution and handling, mixing and storage of chemicals.

SUMMARY

In accordance with one aspect described herein, there is provided a method of producing an in-situ Fenton reagent comprising: providing an aqueous solution comprising at least one contaminant; providing at least one dispenser retaining a hydrogen peroxide generating solid and permitting passage of the aqueous solution through the dispenser; providing at least one column comprising i) an inlet and an outlet separated by a flow chamber, and ii) a mass of iron fibre in the flow chamber retained between the inlet and the outlet; passing the aqueous solution through the at least one dispenser, and passing the aqueous solution through the at least one column, wherein the aqueous solution is acidified upstream of the at least one column.

In accordance with another aspect, there is provided the method described herein, wherein the step of passing the aqueous solution through the at least one column precedes, the step of passing the aqueous solution through the at least one dispenser.

In accordance with another aspect, there is provided the method described herein, wherein the step of passing the aqueous solution through the at least one dispenser precedes the step of passing the aqueous solution through the at least one column.

In accordance with another aspect, there is provided the method described herein, further comprising conditioning an aqueous solution from the at least one dispenser and/or the at least one column in an agitated conditioning tank, wherein the agitated conditioning tank has a volume sufficient for completion of a reaction of the at least one contaminant with the in-situ Fenton reagent.

In accordance with another aspect, there is provided the method described herein, wherein the hydrogen generating solid is sodium percarbonate.

In accordance with another aspect, there is provided the method described herein, wherein the aqueous solution is acidified before passing into the at least one column to a pH of 2.5 to 4.0.

In accordance with another aspect, there is provided the method described herein, wherein the pH is from 2.5 to 3.

In accordance with another aspect, there is provided the method described herein, wherein the pH is 2.5.

In accordance with another aspect, there is provided a system for producing an in-situ Fenton reagent for an aqueous solution comprising: at least one dispenser retaining a hydrogen peroxide generating solid between a dispenser inlet and a dispenser outlet, the dispenser permitting passage of the aqueous solution through the dispenser from the dispenser inlet to the dispenser outlet, at least one column comprising i) an inlet and an outlet separated by a flow chamber, and ii) a mass of iron fibre within the flow chamber retained between the inlet and the outlet, and at least one acidifier upstream of the at least one column, the at least one column and the at least one dispenser are hydraulically connected.

In accordance with another aspect, there is provided the system described herein, wherein the aqueous solution is treated in the at least one column before the at least one dispenser.

In accordance with another aspect, there is provided the system described herein, wherein the aqueous solution is treated in the at least one dispenser before the at least one column.

In accordance with another aspect, there is provided the system described herein, further comprising a second acidifier downstream of the at least one column.

In accordance with another aspect, there is provided the system described herein, further comprising an agitated conditioning tank hydraulically connected to the dispenser outlet, wherein the agitated conditioning tank has a volume sufficient for completion of a reaction of a contaminant with the in-situ Fenton reagent.

In accordance with another aspect, there is provided the system described herein, wherein the hydrogen generating solid is sodium percarbonate.

In accordance with another aspect, there is provided the system described herein, comprising an acidifier positioned upstream of the at least one column.

In accordance with another aspect, there is provided the system described herein, wherein the acidifier comprising a pH meter and an acid dosing system.

DETAILED DESCRIPTION

An "in-situ Fenton reagent" as described herein, means a Fenton oxidizing reagent generated within a hydrogen peroxide generating vessel or dispenser, through contact of an aqueous solution with a solid hydrogen peroxide generating solid; through contact with a ($Fe^{2+}$) ferrous ion generating column and without dosing a liquid hydrogen peroxide into a solution.

The terms "substantially free" of: organic contaminants; chromium (IV), and total chromium ions, is understood as less than 0.1 ppm organic contaminants; and less than 0.1 ppm chromium (IV), by weight, and less than 0.1 ppm total chromium ions by weight. These levels of contaminants can be achieved by the method and system described herein.

The method and system described herein overcomes many disadvantages of producing a Fenton reagent of the prior art. Specifically the method and system described here eliminate the need to store high concentration liquid hydrogen peroxide and ferrous sulfate solutions and dose these solutions into wastewater. In doing so, the method and system described herein eliminate virtually all health and safety issues.

Figure 1:
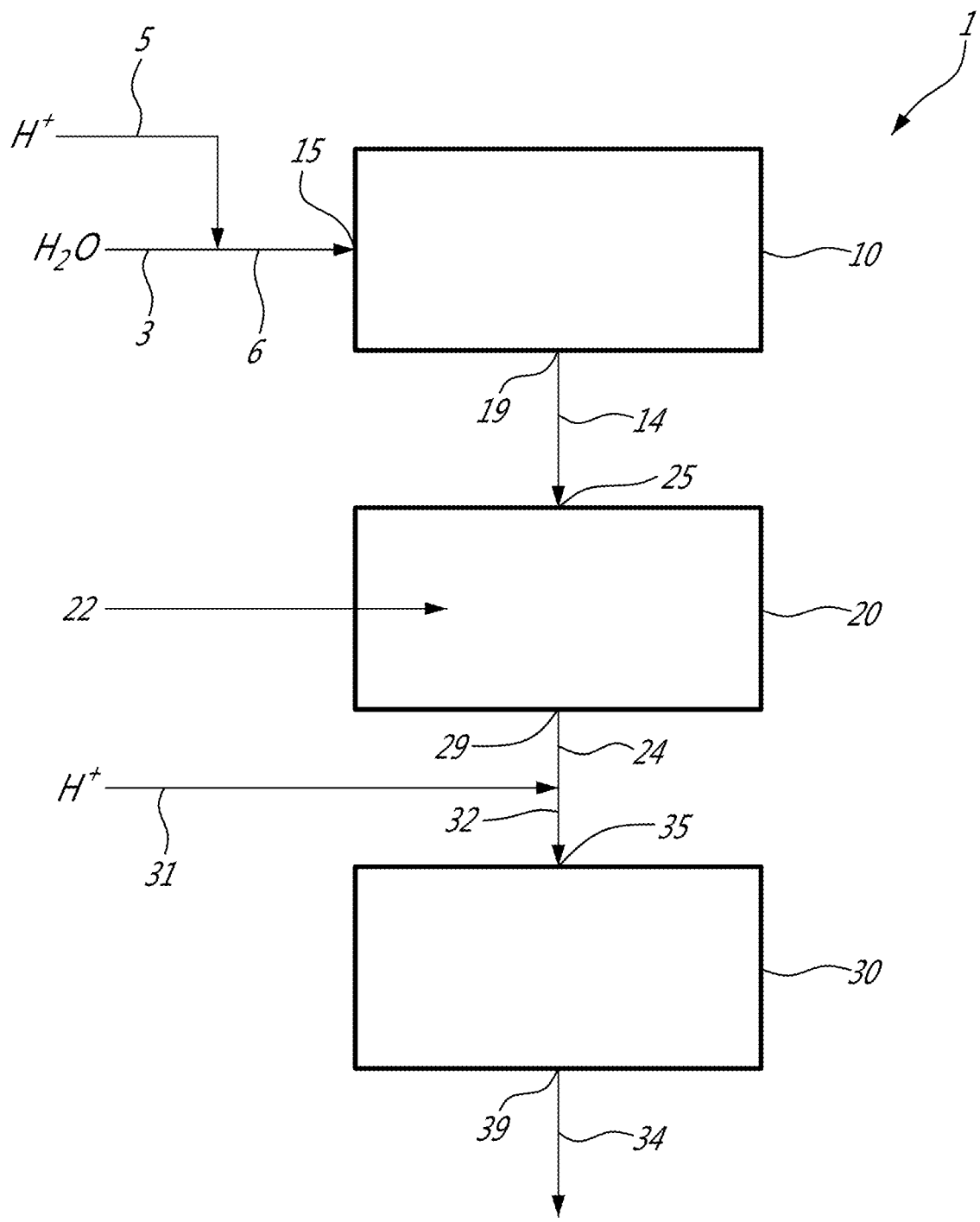
FIG. 1 is a block diagram of a method for producing a Fenton reagent according to one embodiment described herein.

One embodiment of a method for producing a Fenton reagent $Fe^{2+}/H_2O_2$ decontaminating waste water is illustrated in the process block diagram of FIG. 1. The new method 1 includes column/reactor 10. One or more columns/reactors 10 in series or parallel may also be used.

An aqueous solution 3 containing contaminants to be oxidized is transferred into the column 10. The waste streams that are the object of the decontamination process described herein are generally acidic (less than pH 4). The pH of the aqueous solution 3 is monitored and an acidification is undertaken by addition of a mineral acid 5 ($H^+$), that in a preferred embodiment is sulfuric acid and more preferably is concentrated sulfuric acid. The pH of the aqueous solution 3 after acidification and before entry into the column 10 is preferably maintained between 2.5 and 4, more preferably between 2.5 and 3, and most preferably at a pH of 2.5.

The acidified aqueous solution 6 is passed through at least one column/reactor 10. The at least one column 10 comprises an inlet 15 and an outlet 19 separated by a flow chamber for the aqueous solution 6. The flow chamber includes: a mass of iron fibre within, that is held between the inlet 15 and the outlet 19. The mass of iron fibre is a fine mesh that provides a high surface area for contact with the aqueous solution 6. Within the column 10 there is an in-situ generation of ferrous ions according to the following reaction:

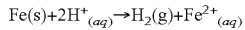

$$Fe(s)+2H^+_{(aq)} \rightarrow H_2(g)+Fe^{2+}_{(aq)} \qquad \text{Equation 1}$$

An acidified ferrous aqueous solution 14 is produced in the column/reactor 10 that is transferred to a dispenser 20. Here too, there may be one or more dispensers 20 arranged in series or in parallel. The at least one dispenser 20, is adapted to retain a hydrogen peroxide generating solid 22 between a dispenser inlet 25 and a dispenser outlet 29. The hydrogen generating solid 22 is generally in the form of a tablet/pellet that is packed into the dispenser 20 and provides a large surface area for contact with the aqueous solution 14. The hydrogen peroxide generating solid 22 although represented with an arrow in FIGS. 1 (and 2) is not generally fed to the dispenser 20 but placed within the dispenser 20, particularly in view of the concentration of contaminants generally being treated. The dispenser 20 is adapted to permit passage of aqueous solutions including the acidified ferrous aqueous solution 14 through the dispenser 20, and in such a way as to ensure intimate contact with the hydrogen peroxide generating solid 22.

The hydrogen peroxide generating solid 22 is preferably a cation percarbonate, and most preferably the hydrogen peroxide generating solid 22 is sodium percarbonate. In a particularly preferred embodiment the hydrogen peroxide generating solid 22 is in the form of a tablet that dissolves slowly when exposed to aqueous solution 14. In a preferred embodiment, AFFRESH™ tablets by Whirlpool Properties Inc. are used. In a preferred embodiment the dispenser 20 has both inlet 25 and outlet 29 in a lower portion of the dispenser 20 and the tablets fill the dispenser 20, and the quantity of hydrogen peroxide released from the tablet depends on the volume of aqueous solution 6 and/or 14 treated.

The reaction of hydrogen peroxide in-situ generation in the dispenser 20 follows the following reaction when sodium percarbonate ($2Na_2CO_3 \cdot 3H_2O_2$) is used:

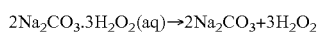

$$2Na_2CO_3 \cdot 3H_2O_2(aq) \rightarrow 2Na_2CO_3 + 3H_2O_2 \qquad \text{Equation 2}$$

The solution 24 leaving the dispenser 20 is the large part the in-situ generated Fenton reagent that comprises both $Fe^{2+}/H_2O_2$, that is now available to react with contaminants. It should be noted that the pH of the solution entering the dispenser 20 is less important and although generally monitored, no acidification of the aqueous solutions 4/14 is required before being transferred to the dispenser 20.

However, as can be seen in Equation 2, $Na_2CO_2$ is generated and to ensure potency and decontamination of solution 24 (the insitu generated Fenton solution) an acid 31 is added, to produce a further acidified in-situ generated Fenton solution that helps to ensure complete neutralization of the contaminants in the waste stream.

In an optional preferred embodiment the solution 32 leaving the dispenser 20 may be transferred to a conditioning tank 30, having an inlet 35 and an outlet 39. The tank 30 serves to give more residence time for reactions with the Fenton $Fe^{2+}/H_2O_2$ reagent with any organic or other compounds. The stream 34 is decontaminated aqueous stream. The process block diagram of FIG. 1 is in a preferred embodiment used for organic contaminants and upon exit from either the dispenser 20 or the conditioning tank 30, the streams 24/34 will be substantially free of organic contaminants.

Figure 2:
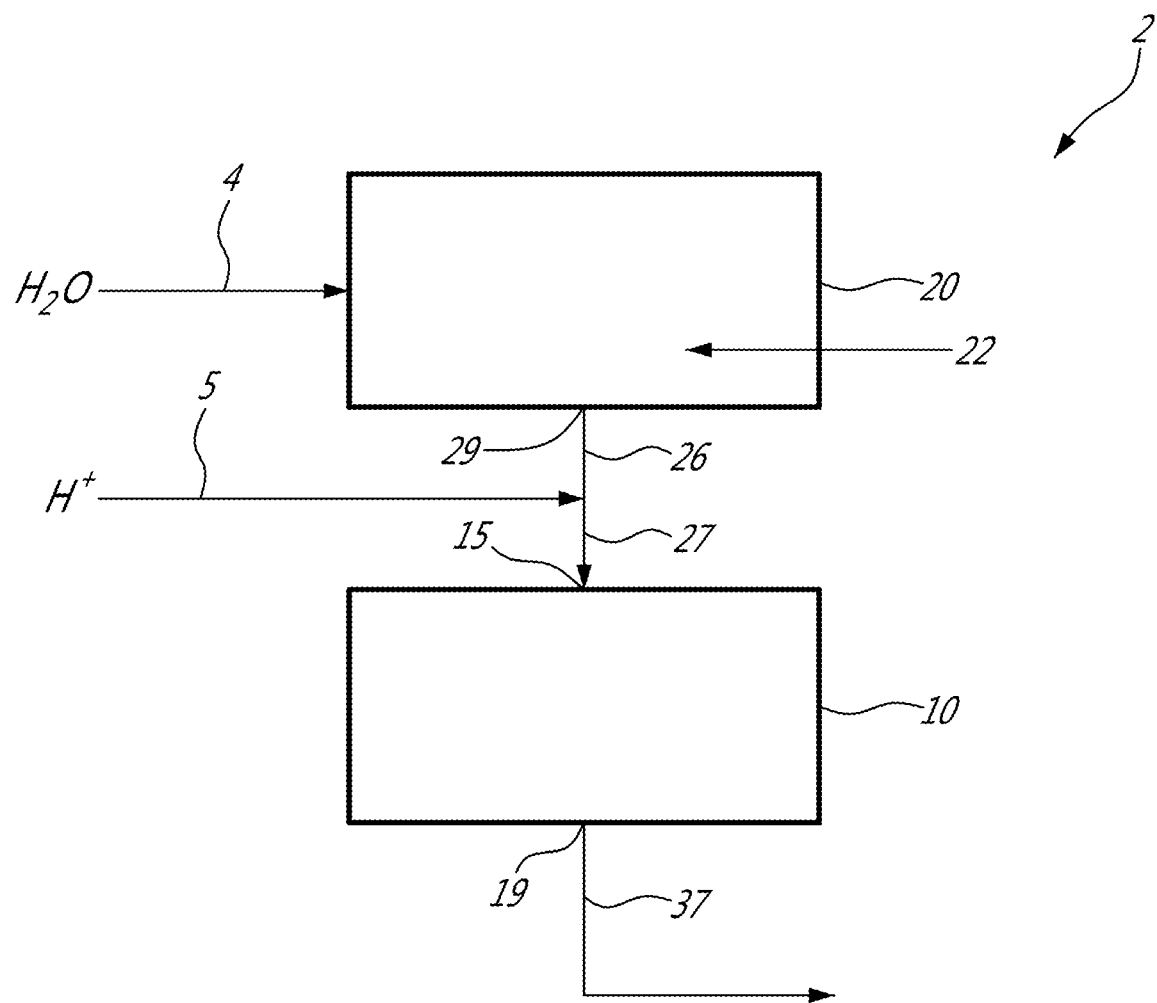
FIG. 2 is a block of another method for producing a Fenton reagent according to a second embodiment described herein.

Turning to FIG. 2 that is another embodiment of the method and system 2 described herein. The flow diagram of FIG. 2 is particularly suitable for dissolved metal contaminants, such as chromium (VI), and total chromium ions removal, but is also suitable for organic contaminants.

Similarly in FIG. 2, an aqueous solution 4 comprising dissolved metal/organic contaminants may be treated by method 2 and is optionally-acidified upstream and/or downstream of the column 20 to the same range of pH as described above.

As seen in FIG. 2, the aqueous solution 4 is first transferred to a dispenser 20, where it is understood that there may be one or more dispensers 20 arranged in series or in parallel. The at least one dispenser 20, is adapted to retain a hydrogen peroxide generating solid 22 between a dispenser inlet 25 and a dispenser outlet 29. The dispenser 20 permitting passage of the contaminant aqueous solution 4 through the dispenser 20 from the dispenser the inlet 25 to the dispenser the outlet 29, and such that the aqueous solution 4 comes into intimate contact with the hydrogen generating solid 22. As can be seen in Equation 2 no hydrogen ions (H+) are required and as such the aqueous solution 4 need not be acidified before the dispenser 20.

The reaction of hydrogen peroxide in-situ generation in the dispenser 20 follows the same reaction when sodium percarbonate ($2Na_2CO_3 \cdot 3H_2O_2$) described above:

$$2Na_2CO_3 \cdot 3H_2O_2(aq) \rightarrow 2Na_2CO_3 + 3H_2O_2 \qquad \text{Equation 2}$$

The hydrogen peroxide containing solution 26 leaving the dispenser 20 in large part includes hydrogen peroxide and the dissolved metal contaminants.

The mechanism for metal contaminant removal is different than that required of organic matter oxidation. Chromium(VI) peroxide ($CrO_5$) or chromium oxide peroxide is an unstable compound formed by the addition of the hydrogen peroxide solutions to solutions of metal chromates or dichromates, such as sodium chromate or potassium dichromate. That is why in the case of chromium, the wastewater is preferably contacted with hydrogen peroxide first and then upon leaving the dispenser is optionally contacted with acid 5 (hydrogen ion $H^+$). The addition of hydrogen ion ($H^+$) is however, optional because the metal contaminant stream being treated by the method and system described herein are generally acidic.

Acidification is performed on the $H_2O_2$ solution 26 leaving the dispenser 20, with the addition of a mineral acid 5, that is once again concentrated sulfuric acid preferably. The pH of the acidified $H_2O_2$ solution 27 is maintained between 2.5 and 4, preferably between 2.5 and 3, and most preferably at a pH of 2.5.

In a preferred embodiment, the system described herein includes an acidifier placed preferably upstream of the column 20. The acidifier comprises a pH meter, and an acid 5 dosing system, that includes a pH controller, and acid metering pump.

Therefore, chromate or dichromate react with the acidified hydrogen peroxide solution 27 to give chromium(VI) peroxide and water outside the dispenser 20 via the Equation 3 to produce acidified solution 27 that includes hydrogen peroxide and metal contaminants:

$$CrO_4^{2-} + 2H_2O_2 + 2H^+ \rightarrow CrO_5 + 3H_2O \qquad \text{Equation 3.}$$

After a few seconds, the chromium(VI) peroxide decomposes to chromium(III).

Then the acidified $H_2O_2$ solution 27 is next transferred to at least one column 10, comprising an inlet 15 and an outlet 19 separated by a flow chamber for the aqueous solution. The flow chamber again includes: a mass of iron fibre within, that is held between the inlet 15 and the outlet 19.

Within the column 10 there is an in-situ generation of ferrous ions according to the following reaction:

$$2Fe^0(s) + O_2(g) + 2H_2O(l) \rightarrow 2Fe^{2+}(aq) + 4HO^-(aq) \qquad \text{Equation 1 A}$$

With the generation of the ferrous ion and hydroxide (OH—) (see Equation 1), the pH increases and Chromium (III) precipitates as chromium hydroxide inside the column. The method 2 is well suited for chromium ion removal, therefore in the case of chromium recovery, the reaction is completed inside the iron fiber within the column 10 and the chromium hydroxide precipitates (as solid particles) and is recovered inside the iron fibre. So, the tablet dispenser 20 of the hydrogen peroxide generating solid 22 is placed before the iron fibers column 10. The iron fibers, also plays the role of a source of $Fe^{2+}$, hydroxides and as a filtration media simultaneously. There is generally no need for a further conditioning/reaction tank as found in the method 1 of FIG. 1.

However, in the case of organic contaminants, a further acidifier/acidification of solution 37 may be appropriate in the ranges between 2.5 and 4.0 pH, preferably 2.5 to 3 pH and most preferably at a pH of 2.5. In the case of organic contaminants a conditioning tank may be used.

In preferred embodiments of the methods 1 and 2 of FIGS. 1 and 2, the level of decontamination can be measured and evaluated with pH and oxidation and reduction potential (ORP) instrumentation most suitably placed in contact with streams 3 and 4 downstream of the in-situ production of the Fenton reagent and then again in streams 24, 34 or 37 downstream of the in-situ production of the Fenton reagent.

The methods and systems described are suitable for various flowrates of wastewater, starting at between 100 ml/hour to 10 liter/hour. It is submitted that these flowrates can be adapted further by adjusting the iron column/reactor 10 and dispenser 20 accordingly and to meet stoichiometric requirements for neutralizing the contaminants present.

Column 10 is in a preferred embodiment a 6", 8" or 12" diameter pipe and a 24" to 48" length. The column 10 inlet and outlet sizes depend on the flowrates, and generally in the range of ½", ¾", to 1" diameter. In a preferred embodiment the column 10, has an 8" diameter a 24" length and ¾" inlet and outlet diameters.

The dispenser 20 sizing also depends on the flowrate of wastewater being treated, and generally has a smaller size than the column 10. The dispenser 20 generally has a 3" or 4" diameter and a height of 8" to 12". The dispenser also has a port into which a hydrogen peroxide generating solid 22 can be added at the top of the dispenser 20, while the dispenser is not in use. Inlet and outlet diameters for the dispenser 20 are generally ¾" to 1" diameter. In a preferred embodiment the dispenser 20, has an 3" diameter a 10" length and ¾" inlet and outlet diameters.

The sizing of the system for preparation of the in-situ Fenton reagent according to one embodiment described herein, depends on at least two parameters:

The composition of the wastewater to be treated (aqueous solution 3 and or 4); and Dosage requirements for ferrous ions and hydrogen peroxide suitable for that composition.

With these two parameters, the flow rate and the size of both iron containing column filter 10 and hydrogen peroxide dispenser 20 can be adjusted.

A. Example of Results with Phenol Destruction:

Tests were performed using a laboratory scale set-up containing a sodium percarbonate tablets dispenser 20 and column filled 10 with iron fibers (similar to that illustrated in FIG. 2 with a conditioning tank 30). A sample of an industrial wastewater 3 containing 1.51 ppm by weight of initial phenols concentration was pumped through the set-up to perform the Fenton oxidation tests. Samples were collected at the treated water stirred tank (conditioning tank 30) for phenols analyses. The initial pH of the wastewater sample was 6.7 and was adjusted after the tablet dispenser 20 to a pH value of 2.5-3, allowing a continuous solubilisation of iron and readjusted to a same value after passage through the iron fiber column 10, that is a preferred pH range for Fenton reaction.

| Time (min) | [H$_2$O$_2$] (ppm) | [Fe] (ppm) | [Phenols] (ppm) |
|---|---|---|---|
| 5 | 30 | 6.23 | <0.02 |
| 10 | 18 | 6.01 | <0.02 |
| 15 | 24 | 12.81 | <0.02 |
| 30 | 20 | 10.06 | <0.02 |
| 60 | 20 | 12.64 | <0.02 |
| 120 | 20 | 14.89 | <0.02 |
| 180 | 20 | 15.20 | <0.02 |

B. Example of Results with Metal Destruction

Tests were performed using a laboratory scale set-up containing a sodium percarbonate tablets dispenser 20 and column 10 filled with iron fibers (similar to that illustrated in FIG. 2 without a conditioning tank 30). A sample of wastewater from an electroplating industry containing 107 ppm by weight of Total chromium (the concentration of Cr(VI) in the aqueous wastewater stream 4 was 95 ppm by weight), at an initial pH of 3.6 was pumped through the set-up to perform the Fenton oxidation tests. Samples were collected at the outlet of the metal fiber column for analyses. The initial pH of the wastewater sample was 3.6 and was adjusted only after passage through the tablet dispenser 20 to an optimal value of 2.5-3.

| Time (min) | [H$_2$O$_2$] (ppm) | [Fe] total (ppm) | [Cr(VI)] (ppm) | [Cr total] (ppm) | pH |
|---|---|---|---|---|---|
| 5 | 55.7 | 8.12 | <0.01 | <0.05 | 6.72 |
| 10 | 58.6 | 13.1 | <0.01 | <0.05 | 6.7 |
| 15 | 42.5 | 13.2 | <0.01 | <0.05 | 6.67 |
| 30 | 33.6 | 9.33 | <0.01 | <0.05 | 6.65 |
| 60 | 58 | 14.6 | <0.01 | <0.05 | 6.61 |
| 120 | 45.2 | 11.55 | <0.01 | <0.05 | 6.72 |
| 180 | 26.7 | 6.01 | <0.01 | <0.05 | 6.7 |

The invention claimed is:

1. A method of producing an in-situ Fenton reagent comprising:
   providing an aqueous solution comprising at least one contaminant;
   providing at least one dispenser retaining a hydrogen peroxide generating solid and permitting passage of the aqueous solution through the dispenser;
   providing at least one column comprising
   i) an inlet and an outlet separated by a flow chamber, and
   ii) a mass of iron fibre in the flow chamber retained between the inlet and the outlet;
   passing the aqueous solution through the at least one dispenser, and
   passing the aqueous solution through the at least one column,
   wherein the aqueous solution is acidified upstream of the at least one column.

2. The method of claim 1, wherein the step of passing the aqueous solution through the at least one column precedes, the step of passing the aqueous solution through the at least one dispenser.

3. The method of claim 1, wherein the step of passing the aqueous solution through the at least one dispenser precedes the step of passing the aqueous solution through the at least one column.

4. The method of claim 1, further comprising conditioning an aqueous solution from the at least one dispenser and/or the at least one column in an agitated conditioning tank, wherein the agitated conditioning tank has a volume sufficient for completion of a reaction of the at least one contaminant with the in-situ Fenton reagent.

5. The method of claim 1, wherein the hydrogen generating solid is sodium percarbonate.

6. The method of claim 1, wherein the aqueous solution is acidified before passing into the at least one column to a pH of 2.5 to 4.0.

7. The method of claim 6, wherein the pH is from 2.5 to 3.

8. The method of claim 6, wherein the pH is 2.5.

9. A system for producing an in-situ Fenton reagent for an aqueous solution comprising:
   at least one dispenser retaining a hydrogen peroxide generating solid between a dispenser inlet and a dispenser outlet, the dispenser permitting passage of the aqueous solution through the dispenser from the dispenser inlet to the dispenser outlet,
   at least one column comprising
   i) an inlet and an outlet separated by a flow chamber, and
   ii) a mass of iron fibre within the flow chamber retained between the inlet and the outlet, the aqueous solution passing through the at least one column from the inlet to the outlet; and
   at least one acidifier upstream of the at least one column, the at least one column and the at least one dispenser are hydraulically connected.

10. The system of claim 9, wherein the aqueous solution is treated in the at least one column before the at least one dispenser.

11. The system of claim 9, wherein the aqueous solution is treated in the at least one dispenser before the at least one column.

12. The system of claim 9, further comprising a second acidifier downstream of the at least one column.

13. The system of claim 11, further comprising an agitated conditioning tank hydraulically connected to the dispenser outlet,
   wherein the agitated conditioning tank has a volume sufficient for completion of a reaction of a contaminant with the in-situ Fenton reagent.

14. The system of claim 9, wherein the hydrogen generating solid is sodium percarbonate.

15. The system of claim 9, comprising an acidifier positioned upstream of the at least one column.

16. The system of claim 15, wherein the acidifier comprising a pH meter and an acid dosing system.

* * * * *